US011351816B2

United States Patent
Funato

(10) Patent No.: US 11,351,816 B2
(45) Date of Patent: Jun. 7, 2022

(54) WHEEL HOLDING DEVICE

(71) Applicant: CENTRAL MOTOR WHEEL CO., LTD., Anjo (JP)

(72) Inventor: Junji Funato, Ama-gun (JP)

(73) Assignee: CENTRAL MOTOR WHEEL CO., LTD., Anjo (JP)

( * ) Notice: Subject to any disclaimer, the term of this patent is extended or adjusted under 35 U.S.C. 154(b) by 2 days.

(21) Appl. No.: 16/968,810

(22) PCT Filed: Feb. 22, 2018

(86) PCT No.: PCT/JP2018/006420
§ 371 (c)(1),
(2) Date: Aug. 10, 2020

(87) PCT Pub. No.: WO2019/163049
PCT Pub. Date: Aug. 29, 2019

(65) Prior Publication Data
US 2021/0001665 A1    Jan. 7, 2021

(51) Int. Cl.
*B60B 30/06*    (2006.01)

(52) U.S. Cl.
CPC .................... *B60B 30/06* (2013.01)

(58) Field of Classification Search
CPC  B60B 30/06; B60B 2900/116; B60C 25/0539
See application file for complete search history.

(56) References Cited

U.S. PATENT DOCUMENTS

| 4,267,867 A | 5/1981 | du Quesne |
| 4,750,538 A | 6/1988 | du Quesne |
| 6,062,289 A | 5/2000 | Cunningham et al. |
| 8,567,453 B2 * | 10/2013 | Donnay ................. B25J 9/1682 |
| | | 141/38 |

FOREIGN PATENT DOCUMENTS

| EP | 0 008 822 A1 | 3/1980 |
| JP | S62-036903 U | 3/1987 |
| JP | 2006-056315 A | 3/2006 |
| JP | 2011-162105 A | 8/2011 |
| JP | 3205394 U | 7/2016 |
| KR | 10-2010-0010762 A | 2/2010 |

* cited by examiner

*Primary Examiner* — Rick K Chang
(74) *Attorney, Agent, or Firm* — Oliff PLC

(57) ABSTRACT

A holding device includes a pair of holding members positioned to be spaced apart from each other in a first direction, and a moving part that moves at least one of the pair of holding members to change a distance between the pair of holding members in the first direction. Each of the holding members is formed with a support face that supports the flange of the wheel, and an engaging portion that is located on an end portion side that is on an opposite side from the other holding member, and is able to engage with the flange of the wheel supported by the support face, from the radially outer side of the wheel. The installation space for a tire mounted on a wheel on the radially outer side of a flange of the wheel is prevented from varying due to the magnitude of the diameter of the wheel.

5 Claims, 4 Drawing Sheets

WHEEL HOLDING DEVICE

TECHNICAL FIELD

A technology disclosed in this description relates to a wheel holding device.

BACKGROUND ART

The wheel holding device is a device for holding a wheel before a tire is mounted on it. A tire assembly is formed by mounting the tire on the wheel held by the wheel holding device.

Conventionally, a wheel holding device including a support portion that supports a wheel, and a pair of holding portions that hold a radially outer portion of the wheel supported by the support portion, is known (see Patent Document 1). The pair of holding portions are formed as separate bodies from the support portion, and are positioned so as to be opposed to each other via the wheel supported by the support portion. Each holding portion includes a table, and a support rod movably provided to be advanced toward the wheel relative to the table. The support rods of the pair of holding portions are respectively moved to be advanced on the tables to press and sandwich the radially outer portion of the wheel, thereby to hold the wheel supported by the support portion.

PRIOR ART DOCUMENT

Patent Document

Patent Document 1: Japanese Unexamined Patent Application Publication No. 2011-162105

SUMMARY OF THE INVENTION

Problem to be Solved by the Invention

Generally, the wheel holding device is required to hold a plurality of types of wheels having different sizes (diameters). In the conventional wheel holding device as described above, the support rod of each holding portion is movably provided; therefore, the wheel holding device is able to hold a plurality of types of wheels. However, in the conventional wheel device, the table is fixedly placed in each holding portion. Thus, where a wheel having a relatively small size is held, the table would be located just outside the wheel, and it may be difficult to mount the tire on the wheel, because the tire interferes with the table when the tire is mounted on the wheel.

In this description, a technology that makes it possible to solve at least a part of the above problem is disclosed.

Means for Solving the Problem

The technology disclosed in this description can be implemented in the following forms.

(1) A wheel holding device disclosed in this description includes a pair of holding members positioned to be spaced apart from each other in a first direction, and a moving part that moves at least one of the pair of holding members so as to change a distance between the pair of holding members in the first direction. Each of the holding members is formed with a support face that supports a flange of a wheel, and an engaging portion that is located on an end portion side that is on an opposite side from the other holding member, and is able to engage with the flange of the wheel supported by the support face, from a radially outer side of the wheel. In the wheel holding device, the flange of the wheel is supported by the support faces formed on the pair of holding members. The distance between the pair of holding members is reduced by the moving part, so that the flange of the wheel is engaged with the engaging portions formed on the pair of holding members; as a result, the wheel is held by the wheel holding device. Also, with this arrangement, it is possible to hold a plurality of types of wheels having different diameters. Also, at this time, the size of a portion of the holding member which protrudes radially outward of the flange of the wheel is uniform, irrespective of the magnitude of the diameter of the wheel. Thus, the installation space for the tire mounted on the wheel on the radially outer side of the flange of the wheel can be prevented from varying due to the magnitude of the diameter of the wheel.

(2) In the wheel holding device, each of the holding members may be further formed with a protruding portion that is located on one side closer to the other holding member, relative to the support face. In the wheel holding device, after the tire is mounted on the wheel, the distance between the pair of holding members is increased by the moving part, so that the wheel with the tire, which is held by the wheel holding device, is detached. At this time, the inner circumferential surface of the wheel abuts against the protruding portions formed on the pair of holding members, so that the flange of the wheel can be prevented from dropping off from the holding members.

(3) In the wheel holding device, the engaging portion may include an inclined portion of which a height from a virtual plane including the support face is reduced toward an end portion on the opposite side of the holding member. In the wheel holding device, the engaging portion includes the inclined portion of which the height from the virtual plane including the support face is reduced toward the end portion on the opposite side of the holding member. With this arrangement, it is possible to reduce the pressing force applied from the tire mounted on the wheel to the engaging portion, while curbing reduction of the engaging force applied to the flange of the wheel due to reduction of the height of the engaging portion as a whole.

The technology disclosed in this description can be implemented in various forms. For example, it can be implemented as a method of producing a tire assembly, a method of holding (detaching) the wheel, and a wheel holding device, and in the forms of a computer program for implementing these methods or the functions of the device, a recording medium in which the computer program is recorded, and so forth.

MODES FOR CARRYING OUT THE INVENTION

A. Embodiment

A-1. Configuration

Figure 1:
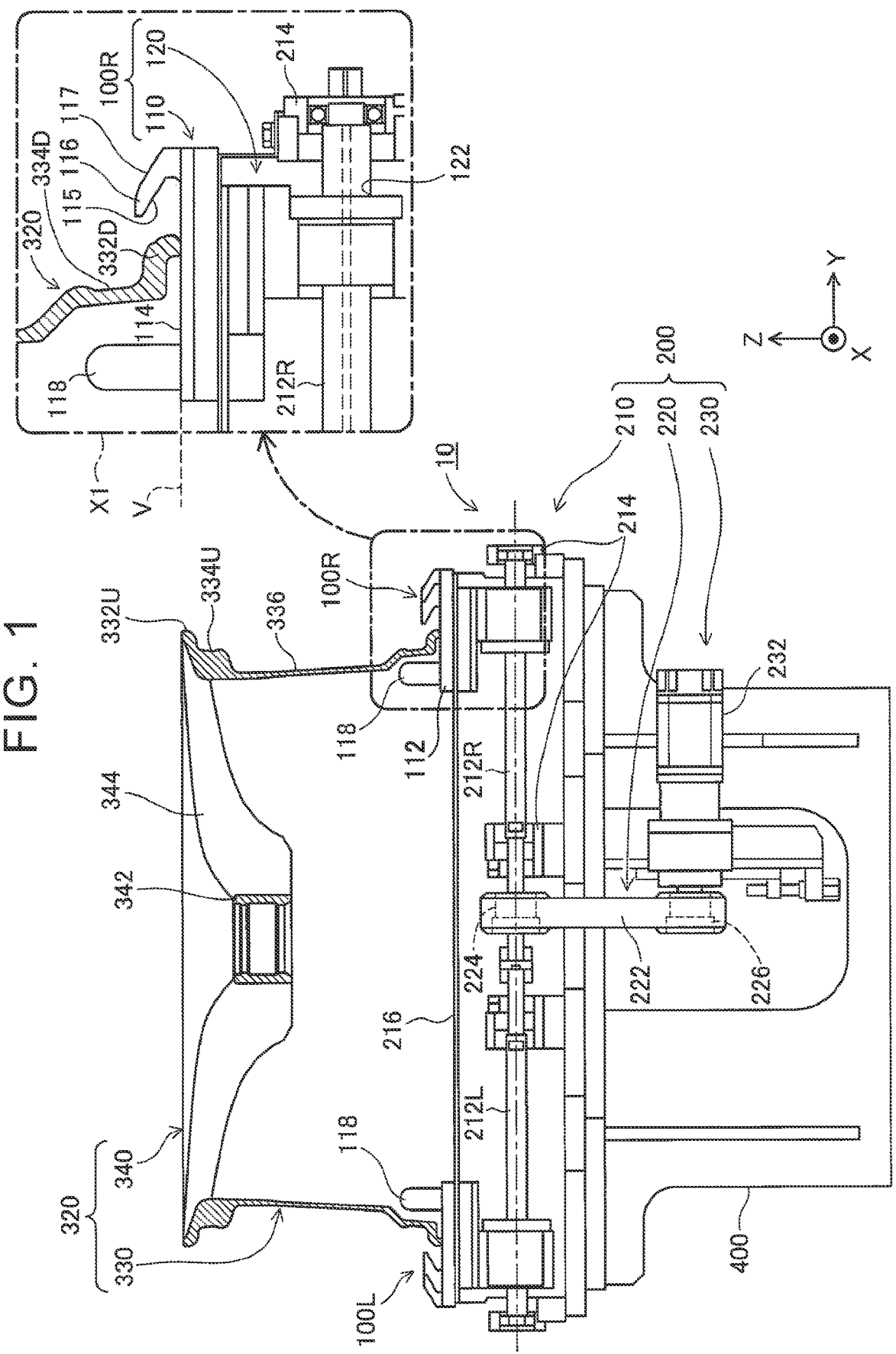
FIG. 1 is a YZ plan view schematically showing the exterior configuration of a wheel holding device 10 of this embodiment.
Figure 2:
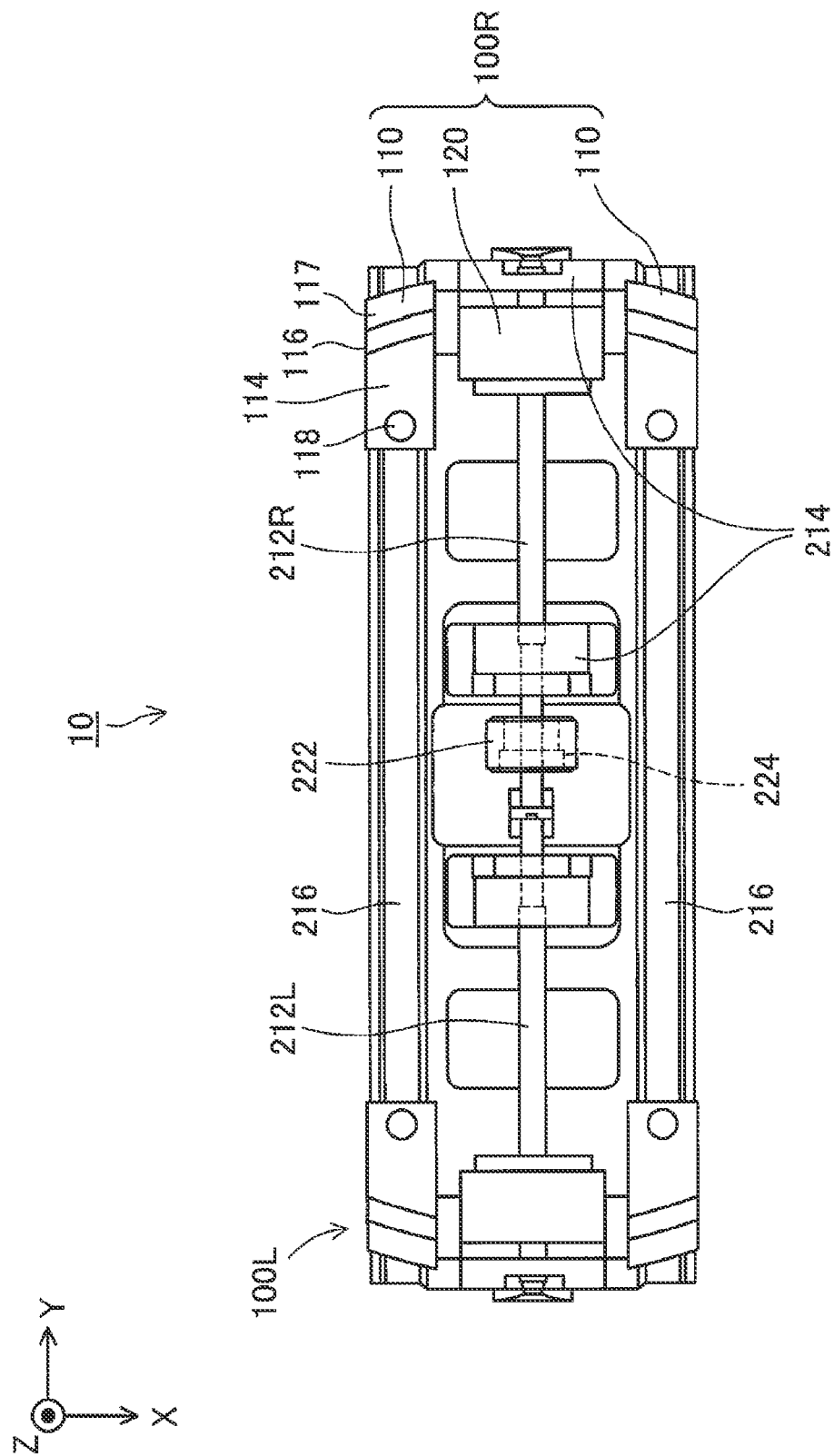
FIG. 2 is an XY plan view schematically showing the exterior configuration of the wheel holding device 10 of this embodiment.

FIG. 1 is a YZ plan view (side view) schematically showing the exterior configuration of a wheel holding device 10 of this embodiment, and FIG. 2 is an XY plan view (top view) schematically showing the exterior configuration of the wheel holding device 10 of this embodiment. In each drawing, the XYZ axes that are at right angles to each other, for specifying directions, are indicated. In FIG. 1, an X1 portion of FIG. 1 is enlarged and illustrated. In this description, the Z direction will be called vertical direction (the Z-axis positive direction will be called upper direction, and the Z-axis negative direction will be called lower direction), and the Y direction will be called lateral direction (the Y-axis positive direction will be called rightward direction, and the Y-axis negative direction will be called leftward direction), while the X direction will be called longitudinal direction (the X-axis positive direction will be called front direction, and the X-axis negative direction will be called back direction), for the sake of convenience. This applies to FIG. 3 and the following figures.

A-1-1. Structure of Tire Assembly 300

The tire assembly 300 includes a wheel 320 for a vehicle, and a tire 310 mounted on the wheel 320 (see FIG. 3 and FIG. 4 that will be described later). In FIG. 1, the wheel 320 is positioned such that the direction of the rotational axis of the wheel 320 substantially coincides with the vertical direction (the Z direction). In FIG. 1, the upper side (the Z-axis positive direction) relative to the wheel 320 (the tire assembly 300) will be called "outer side", and the lower side (the Z-axis negative direction) will be called "inner side". When the wheel 320 is installed on a vehicle body (not shown), the outer side of the wheel 320 faces a direction opposite to a direction toward the vehicle body, and the inner side of the wheel 320 faces the direction toward the vehicle body. In this connection, the form of the wheel 320 (the tire assembly 300) shown in each figure is merely exemplary, and may be one of various forms other than this.

The wheel 320 is formed of light alloy, such as aluminum alloy or magnesium alloy. The wheel 320 has a generally cylindrical wheel rim 330, and a wheel disc 340 disposed on the radially inner side of the wheel rim 330. The wheel rim 330 includes a pair of flange portions 332U, 332D, a pair of bead seat portions 334U, 334D, and a drop portion 336 that is recessed radially inward of the wheel 320, relative to the bead seat portions 334U, 334D. The wheel disc 340 is located on the upper side (outer side) of the wheel rim 330, and includes a hub mounting portion 342 (center bore), and a plurality of spoke portions 344. The wheel 320 may be of a so-called one-piece type, in which the wheel rim 330 and the wheel disc 340 are formed integrally, or may be of a so-called two-piece type, in which the wheel rim 330 and the wheel disc 340 are separate members. In the following, the flange portion 332U and bead seat portion 334U located on the upper side (outer side) in FIG. 1 will be called upper flange portion 332U and upper bead seat portion 334U, and the flange portion 332D and bead seat portion 334D located on the lower side (inner side) will be called lower flange portion 332D and lower bead seat portion 334D.

The tire 310 is formed, including raw rubber (natural rubber or synthetic rubber), tire cord, reinforcement material, bead wire, and compounding agent. The tire 310 includes a pair of side walls 312U, 312D, a pair of bead portions 314U, 314D, and a tread surface 316. In the following, the side wall 312U and bead portion 314U located on the upper side (outer side) will be called upper side wall 312U and upper bead portion 314U, and the side wall 312D and bead portion 314D located on the lower side (inner side) will be called lower side wall 312D and lower bead portion 314D.

A-1-2. Structure of Wheel Holding Device 10

The wheel holding device 10 is a device for holding (placing) the wheel 320 before mounting of the tire 310, and releasing (detaching) the state of holding the wheel 320 after mounting of the tire 310, in a mounting step of mounting the tire 310 on the wheel 320. Specifically, the wheel holding device 10 has a pair of holding members 100L, 100R, and a moving part 200, as shown in FIG. 1 and FIG. 2. The moving part 200 is disposed on an installation stand 400.

(Holding Members 100L, 100R)

The pair of holding members 100L, 100R are spaced apart from each other in the lateral direction (Y direction), and are arranged to be opposed to each other. Each of the holding members 100L, 100R includes a pair of holding portions 110, and a connecting portion 120. The pair of holding portions 110 are arranged side by side in the longitudinal direction (X direction). The connecting portion 120 connects the pair of holding portions 110 with each other. Each holding portion 110 includes a base portion 112, an engaging portion 116, and a protruding portion 118. The base portion 112 is in the form of a generally flat plate, and a part of the upper face provides a support face 114 that supports the lower flange portion 332D of the wheel 320.

The engaging portion 116 is located on an end portion side that is the opposite side from the other holding member that faces the holding member including the engaging portion 116 concerned in the lateral direction. For example, in the right holding member 100R, the engaging portion 116 is located on a right end portion side (the opposite side from the left holding member 100L) of the base portion 112 of the holding portion 110. Specifically, the engaging portion 116 is located on the right-hand side relative to the support face 114 (the opposite side of the support face 114 from the left holding member 100L), on the base portion 112 of the holding portion 110. Also, the engaging portion 116 is configured (in the shape of a hook) to be able to engage with the lower flange portion 332D of the wheel 320 supported on the support face 114, from the radially outer side of the wheel 320.

The engaging portion 116 is formed with a radially inner portion 115, and a radially outer portion 117. The radially inner portion 115 is located on the radially inner side (closer to the support face 114) of the engaging portion 116, to be continuously connected with the support face 114, and is inclined so as to be closer to the other holding member as it is spaced apart from a virtual plane V (see X1 of FIG. 1) including the support face 114, in the vertical direction (Z direction). The radially outer portion 117 is located on the radially outer side of the engaging portion 116, and is inclined such that its height from the virtual plane V is reduced as it is directed to the opposite side from the other holding member. For example, in the right holding member 100R, the radially inner portion 115 located on the radially inner side (left side) of the engaging portion 116 is connected continuously with the support face 114, and is inclined so as to be closer to the left holding member 100L (the radially inner side) as it is directed toward the upper distal end of the radially inner portion 115. The radially outer portion 117 is also inclined so as to be closer to the left holding member 100L (the radially inner side) as it is directed toward the upper distal end. As shown in FIG. 2, the shape of the engaging portions 116 respectively formed on the pair of holding portions 110 that constitute the same holding member as viewed in the vertical direction is a generally arc-like shape on a concentric circle. The lateral direction corresponds to first direction in CLAIMS, and the radially outer portion 117 corresponds to inclined portion in CLAIMS.

The protruding portion 118 is located on one side of the support face 114 closer to the other holding member. For example, in the right holding member 100R, the protruding portion 118 is located on the left-hand side of the support face 114. Also, the protruding portion 118 is generally opposed to the engaging portion 116 in the lateral direction (Y direction). Also, the protruding portion 118 is shaped like a cylinder extending in the vertical direction (Z direction), and an upper distal end portion of the protruding portion 118 has a semi-spherical shape.

(Moving Part 200)

The moving part 200 changes the distance between the pair of holding members 100L, 100R in the lateral direction (Y direction). Specifically, the moving part 200 includes a guide mechanism 210, a transmission mechanism 220, and a drive mechanism 230. The guide mechanism 210 includes a pair of pole screws 212L, 212R, two pairs of bearings 214, and a pair of guide rails 216. Each guide rail 216 is a rod-like body that extends in the lateral direction, and the pair of guide rails 216 are arranged with a spacing provided in the longitudinal direction (X direction). The pair of holding portions 110 of each holding member 100L, 100R are positioned to be able to move on the pair of guide rails 216.

The pair of pole screws 212L, 212R, which correspond to the pair of holding members 100L, 100R, are positioned so as to be arranged in the lateral direction. Each pole screw 212L, 212R is a rod-like body that extends in the lateral direction, and a thread groove is formed over substantially the entire length in its outer circumferential surface. Also, each pole screw 212L, 212R is rotatably supported by a pair of bearings 214. One end side of each pole screw 212L, 212R is screwed into a threaded hole formed through the connecting portion 120 of one of the pair of holding members 100L, 100R, and the other end side is connected to the transmission mechanism 220. With this arrangement, when each pole screw 212L, 212R rotates, each holding member 100L, 100R moves in the lateral direction. For example, in the right holding member 100R, the right end portion of the right pole screw 212R is screwed into a threaded hole formed in the connecting portion 120 of the right holding member 100R, and the left end side is connected to the transmission mechanism 220. When the right pole screw 212R rotates, the right holding member 100R moves in the lateral direction.

The transmission mechanism 220 transmits driving force from the drive mechanism 230 to the guide mechanism 210. Specifically, the transmission mechanism 220 includes a first roller 224, a second roller 226, and a ring-shaped belt 222 looped around the first roller 224 and the second roller 226. The first roller 224 is connected to each pole screw 212L, 212R of the guide mechanism 210. When the first roller 224 rotates in one direction, the pair of pole screws 212L, 212R rotate, and the pair of holding members 100L, 100R move in accordance with the rotation, so as to be spaced apart from each other. On the other hand, when the first roller 224 rotates in the other direction, the pair of pole screws 212L, 212R rotate in the reverse direction, and the pair of holding members 100L, 100R move in accordance with the rotation, so as to come closer to each other. The second roller 226 is connected to the drive mechanism 230, and rotates with driving force from the drive mechanism 230. When the second roller 226 rotates, the first roller 224 rotates, via the belt 222.

The drive mechanism 230 includes a servo motor 232, and a rotary shaft of the servo motor 232 is connected to the second roller 226. When the servo motor 232 is driven to rotate, the belt 222 of the transmission mechanism 220 performs rotary motion, and the distance between the pair of holding members 100L, 100R of the guide mechanism 210 is changed.

A-2. Holding and Release of the Wheel 320 in the Wheel Holding Device 10

(Holding of the Wheel 320)

Figure 3:
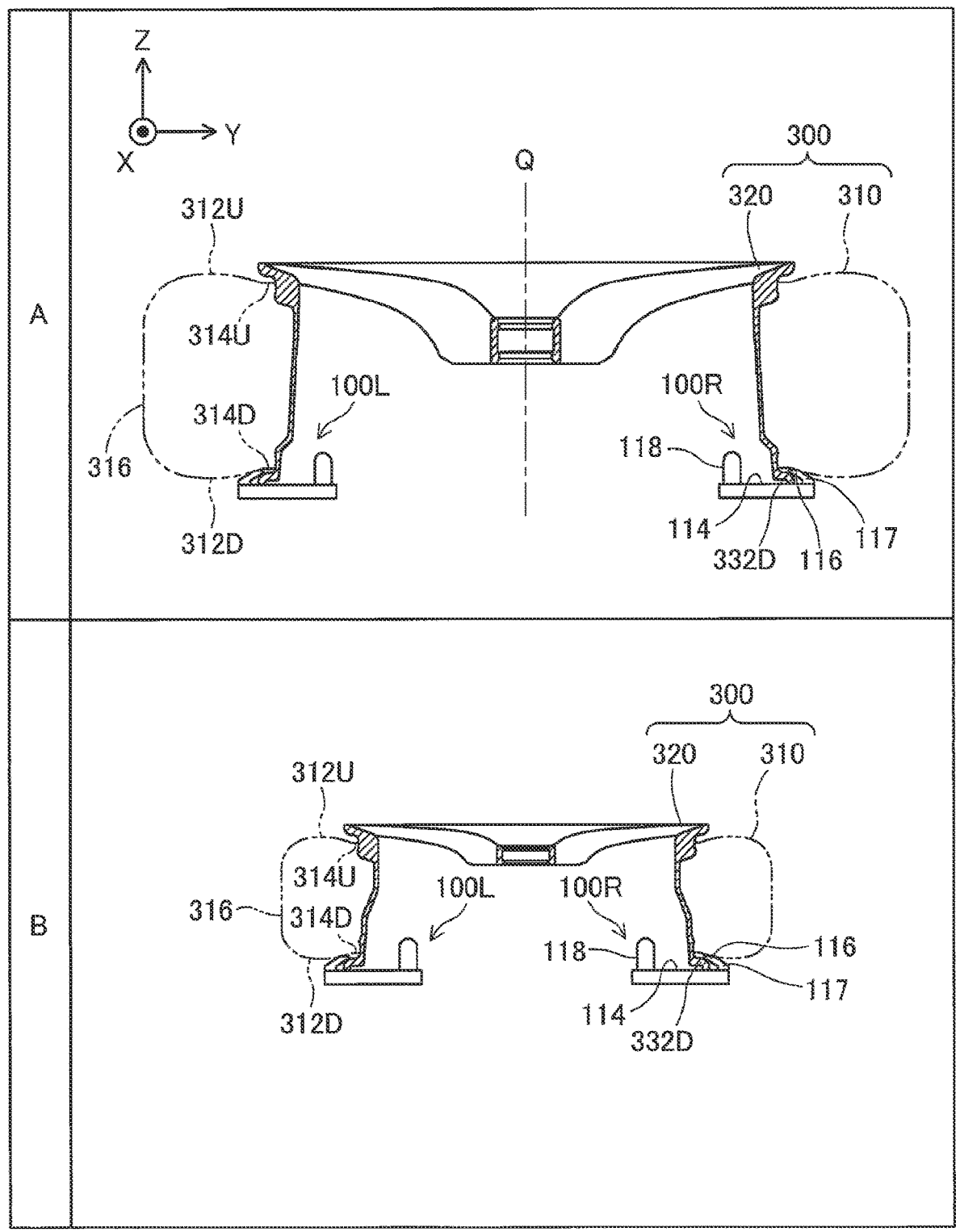
FIG. 3 is an explanatory view showing a condition where a wheel 320 is held by a pair of holding members 100L, 100R.

FIG. 3 is an explanatory view showing a condition where the pair of holding members 100L, 100R holds the wheel 320. FIG. 3A shows a condition where the wheel 320 of a type having a larger size (diameter) than that of FIG. 3B is held. Also, a virtual line Q indicates the initial position of the rotational axis O of the wheel 320 in the condition where the wheel 320 is held (which applies to FIG. 4 that will be described later). To have the wheel 320 held by the wheel holding device 10, the moving part 200 initially changes the distance between the pair of holding members 100L, 100R, so that the lower flange portion 332D of the wheel 320 to be held can be disposed on each support face 114 of the pair of holding members 100L, 100R, as shown in FIG. 1. For example, when the size of the wheel 320 to be held is relatively large, the distance between the pair of holding members 100L, 100R is increased (see FIG. 3A). When the size of the wheel 320 to be held is relatively small, the distance between the pair of holding members 100L, 100R is reduced (see FIG. 3B). Then, the wheel 320 to be held is disposed on each support face 114 of the pair of the holding members 100L, 100R. At this time, in each holding member 100L, 100R, the lower flange portion 332D of the wheel 320 to be held is located between the engaging portion 116 and the protruding portion 118, in the lateral direction (Y direction), for example.

Then, the moving part 200 starts moving the pair of holding members 100L, 100R, so that each of the pair of holding members 100L, 100R comes closer to the wheel 320 side at the same time with each other, at substantially the same speed. Then, the moving part 200 stops moving the pair of holding members 100L, 100R, when each engaging portion 116 of the pair of holding members 100L, 100R reaches a position at which it can engage with the lower flange portion 332D of the wheel 320 to be held. In this manner, as shown in FIG. 3A and FIG. 3B, it is possible to have the wheel 320 held by the wheel holding device 10, by engaging the engaging portions 116 of the pair of holding members 100L, 100R with the lower flange portions 332D, irrespective of the size of the wheel 320 to be held.

Then, the tire 310 is mounted on the wheel 320 held by the wheel holding device 10. Specifically, with a mounting device that is not shown in the figures, the tire 310 is mounted on the wheel 320, to form the tire assembly 300. More specifically, the upper bead portion 314U of the tire 310 is located on the upper bead seat portion 334U of the wheel 320, and the lower bead portion 314D of the tire 310 is located on the lower bead seat portion 334D of the wheel 320.

Here, generally, the width of the tire 310 in the vertical direction (Z direction) increases in a direction from the bead portions 314U, 314D toward the side walls 312U, 312D. Thus, as shown in FIG. 3A and FIG. 3B, a part of the lower bead portion 314D and lower side wall 312D of the tire 310 mounted on the wheel 320 are located on the lower side of the wheel 320 than the lower flange portion 332D. Then, the engaging portions 116, in particular, their radially outer sides, interfere with the tire 310, and pressing force from the tire 310 to the engaging portions 116 is increased; as a result, in a step of releasing the state of holding the wheel 320 as described later, the lower flange portion 332D of the wheel 320 is less likely to be pulled out of the engaging portions 116.

Here, if the height of the engaging portions 116 is reduced, so as to reduce interference between the engaging portions 116 and the tire 310, the engaging force of the engaging portions 116 may be reduced, and the force with which the wheel 320 is held may be reduced. On the other hand, in this embodiment, the radially outer portion 117 of the engaging portion 116 is inclined such that the height from the virtual plane V is reduced in a direction opposite to the other holding member, as described above. Thus, it is possible to reduce the pressing force applied from the tire 310 mounted on the wheel 320 to the engaging portions 116, while curbing reduction of the engaging force applied to the lower flange portion 332D of the wheel 320, which would occur due to reduction of the height of the engaging portions 116 as a whole.

(Release of the State of Holding the Wheel 320)

Figure 4:
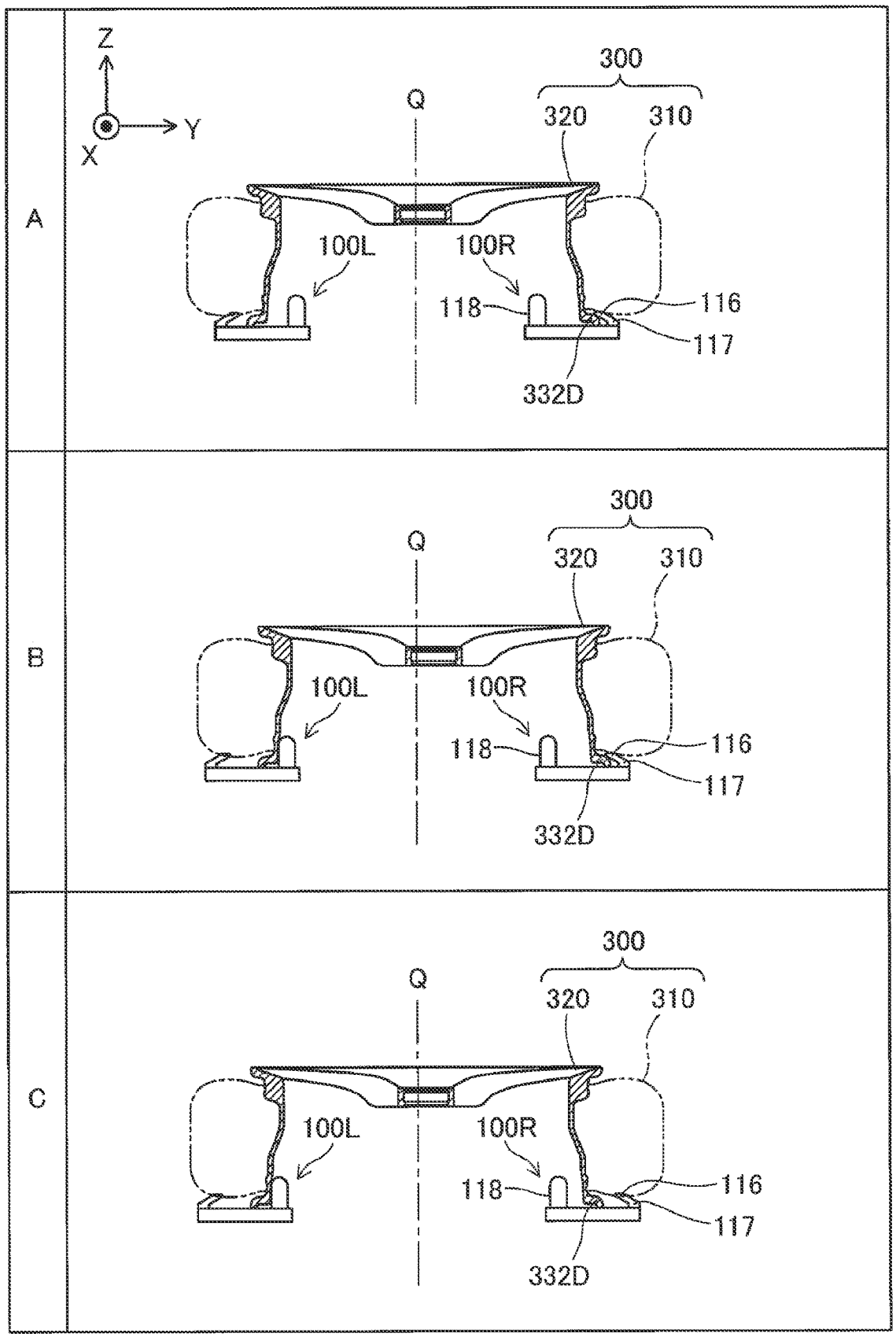
FIG. 4 is an explanatory view showing a process of releasing a state of holding the wheel 320 by the pair of holding members 100L, 100R.

FIG. 4 is an explanatory view showing a process of releasing the state of holding the wheel 320 by the pair of holding members 100L, 100R. After the mounting step, the holding state (the state shown in FIG. 3) in which the wheel 320 of the tire assembly 300 is held by the pair of holding members 100L, 100R is released. Specifically, the moving part 200 moves the pair of holding members 100L, 100R, so as to increase the distance between the pair of holding members 100L, 100R. At this time, the wheel 320 (tire assembly 300) may be dragged toward one of the pair of holding members 100L, 100R, and the rotational axis O may be shifted from the virtual line Q in the lateral direction. It may be considered, as a factor of this, that the resistance to friction with the wheel 320 differs, between the respective support faces 114 of the pair of holding members 100L, 100R, for example. Also, as shown in FIG. 3 and FIG. 4, it may be considered that the engaging portion 116 and the lower flange portion 332D are less likely to be disengaged from each other due to the pressing force applied from the tire 310 to the engaging portion 116.

In FIG. 4A and FIG. 4B, a condition where the engaging portion 116 of the right holding member 100R and the lower flange portion 332D of the wheel 320 are not disengaged from each other is shown. With this condition, as the distance between the pair of holding members 100L, 100R increases, the wheel 320 is dragged, such that the rotational axis O of the wheel 320 is shifted to the right from the virtual line Q. Here, if the protruding portion 118 is not formed on the left holding member 100L, the lower flange portion 332D of the wheel 320 drops off from the support face 114 of the left holding member 100L. However, the protruding portion 118 is formed on the left holding member 100L. Therefore, as shown in FIG. 4B, the protruding portion 118 of the left holding member 100L abuts against the inner circumferential surface of the wheel 320 (see FIG. 4B), and movement of the wheel 320 to the right is restricted, so that the lower flange portion 332D of the wheel 320 is prevented from dropping off from the support face 114 of the left holding member 100L. Also, even if the engaging portion 116 and the lower flange portion 332D are less likely to be disengaged from each other due to the pressing force applied from the tire 310 to the engaging portion 116, movement of the wheel 320 is restricted by the protruding portion 118, so that the engaging portion 116 and the lower flange portion 332D can be disengaged from each other. Thus, as shown in FIG. 4C, it is possible to release the state of holding the wheel 320, and detach the wheel 320 from the wheel holding device 10, while preventing the wheel 320 from dropping off from the holding members 100L, 100R.

A-3. Effects of the Embodiment

As described above, in the embodiment, the flange portion 332D of the wheel 320 is supported by the support faces 114 formed on the pair of holding members 100L, 100R. The distance between the pair of holding members 100L, 100R is reduced by the moving part 200, so that the flange portion 332D of the wheel 320 is engaged with the engaging portions 116 formed on the pair of holding members 100L, 100R; as a result, the wheel 320 is held by the wheel holding device 10. Also, with this arrangement, it is possible to hold a plurality of types of wheels 320 having different diameters. Also, at this time, the size of portions of the holding members 100R, 100L which protrude radially outward of the flange portion 332D of the wheel 320 is uniform, irrespective of the magnitude of the diameter of the wheel 320. Thus, the installation space for the tire 310 mounted on the wheel 320 on the radially outer side of the flange portion 332D of the wheel 320 can be prevented from varying due to the magnitude of the diameter of the wheel 320. More specifically, in this embodiment, the support faces 114 that support the wheel 320 and the engaging portions 116 that hold the wheel 320 are formed on the holding members 100L, 100R, so as to be able to move as a unit. Therefore, as shown in FIG. 3B by way of example, even where the wheel 320 has a relatively small size, there is nothing that is located just outside of the wheel 320 and interferes with the tire 310. Accordingly, the tire 310 can be smoothly mounted on the wheel 320.

Also, in this embodiment, after the tire 310 is mounted on the wheel 320, the distance between the pair of holding members 100L, 100R is increased by the moving part 200, so that the wheel 320 with the tire, which is held by the wheel holding device 10, is detached. At this time, the inner circumferential surface of the wheel 320 abuts against the protruding portions 118 formed on the pair of holding members 100L, 100R, so that the flange portion 332D of the wheel 320 can be prevented from dropping off from the holding members 100L, 100R.

Also, in this embodiment, the engaging portion 116 includes the radially outer portion 117 of which the height from the virtual plane V including the support face 114 is reduced in a direction toward an end portion on the opposite side of the holding member 100L, 100R. With this arrangement, it is possible to reduce the pressing force applied from the tire 310 mounted on the wheel 320 to the engaging portion 116, while curbing reduction of the engaging force applied to the flange portion 332D of the wheel 320, which would occur due to reduction of the height of the engaging portion 116 as a whole. As the tire 310 is formed of a relatively hard rubber material, such as when it is an extremely flat tire, the repulsion force of the tire is large, and therefore, it is particularly useful to apply this invention.

B. Modified Examples

The technology disclosed in this description is not limited to the above embodiment, but may be modified in various forms, within a range that does not depart from its principle, and modifications as follows can be made, for example.

The configuration of the wheel holding device 10 in the above embodiment is merely one example, and can be modified in various ways. For example, while one holding member 100L, 100R includes a pair of holding portions 110, in the above embodiment, it may include one, or three or more holding portions 110. Also, each holding member 100L, 100R may not include the protruding portion 118.

Also, in the above embodiment, the engaging portion 116 may not include the radially outer portion 117. Also, in the above embodiment, the protruding portion 118 may not be opposed to the engaging portion 116 in the lateral direction (Y direction), but at least, may be located on one side of the support face 114 closer to the other holding member. Also, the upper distal end portion of the protruding portion 118 may have more than a semi-spherical shape (for example, a flat shape).

Also, in the above embodiment, the moving part 200 changes the distance between the pair of holding members 100L, 100R, by moving both of the pair of holding members 100L, 100R; however, the moving part 200 may move only one of the pair of holding members 100L, 100R.

Also, the method of producing the tire assembly 300 in the above embodiment is merely one example, and can be modified in various ways. For example, in the above embodiment, the pair of holding members 100L, 100R may hold the wheel 320, in a condition where the outer side is located downside. Also, the wheel holding device 10 is not limited to the one that supports the wheel 320 in a condition where the wheel 320 is laid down with the rotational axis O parallel to the vertical direction. For example, the wheel holding device 10 may be configured to hold the wheel 320, in a condition where the wheel 320 stands vertically with the rotational axis O parallel to the horizontal direction.

DESCRIPTION OF SIGNS

10: wheel holding device 100L, 100R: holding member 110: holding portion 112: base portion 114: support face 115: radially inner portion 116: engaging portion 117: radially outer portion 118: protruding portion 120: connecting portion 200: moving part 210: guide mechanism 212L, 212R: pole screw 214: bearing 216: guide rail 220: transmission mechanism 222: belt, 224: first roller 226: second roller 230: drive mechanism 232: servo motor 300: tire assembly 310: tire 312U, 312D: side wall 314U, 314D: bead portion 316: tread surface 320: wheel 330: wheel rim 332U, 332D: flange portion 334U, 334D: bead seat portion 336: drop portion 340: wheel disc 342: hub mounting portion 344: spoke portion 400: installation stand O: rotational axis Q: virtual line V: virtual plane

The invention claimed is:

1. A wheel holding device comprising:
a pair of holding members positioned to be spaced apart from each other in a first direction; and
a moving part that moves at least one of the pair of holding members so as to change a distance between the pair of holding members in the first direction, wherein
each of the holding members is formed with
a support face that supports a flange of a wheel, and
an engaging portion that is located on an end portion side that is on an opposite side from the other holding member, and is able to engage with the flange of the wheel supported by the support face, from a radially outer side of the wheel, the engaging portion being a first protrusion that extends from the support face.

2. The wheel holding device according to claim 1, wherein
each of the holding members is further formed with a protruding portion that is located on one side closer to the other holding member, relative to the support face.

3. The wheel holding device according to claim 2, wherein
the protruding portion is a second protrusion that extends upward from the support face.

4. The wheel holding device according to claim 1, wherein
the engaging portion includes an inclined portion of which a height from a virtual plane including the support face is reduced toward an end portion on the opposite side of the holding member.

5. The wheel holding device according to claim 1, wherein
the first protrusion is inclined upward from the support face and toward the other holding member.

* * * * *